UNITED STATES PATENT OFFICE.

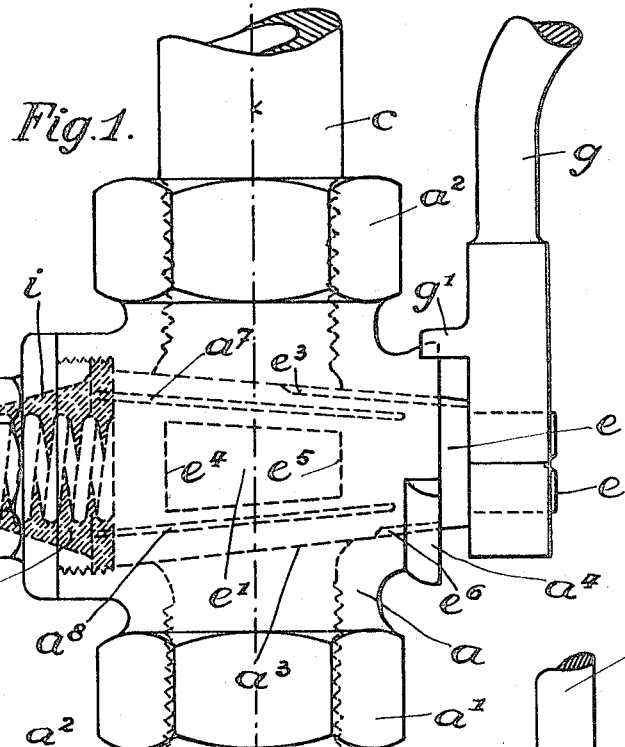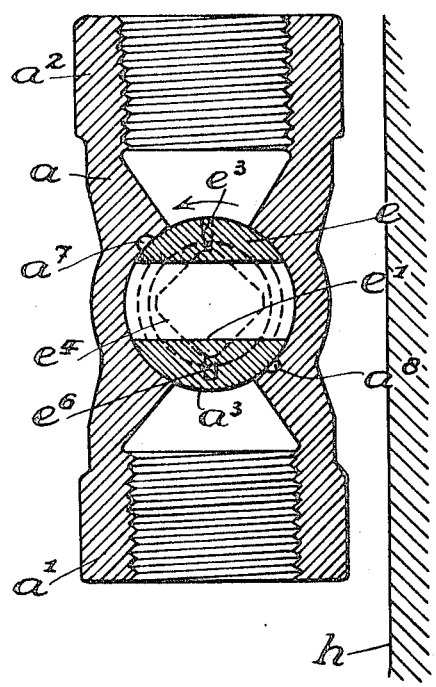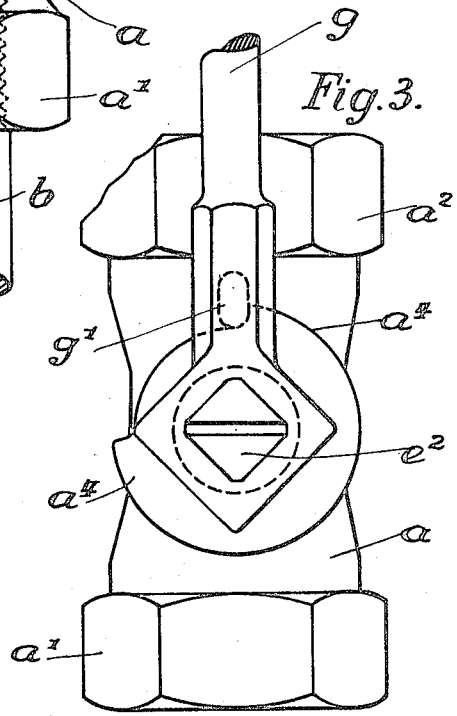

ARMAND GIRARDET, OF YVERDON, SWITZERLAND.

PLUG-COCK FOR CONDUITS OF ELASTIC FLUIDS UNDER PRESSURE.

1,289,730.  Specification of Letters Patent.  Patented Dec. 31, 1918.

Application filed January 21, 1918. Serial No. 212,961.

*To all whom it may concern:*

Be it known that I, ARMAND GIRARDET, mechanician, a citizen of Switzerland, residing at Yverdon, Canton of Vaud, in the Confederation of Switzerland, have invented certain new and useful Improvements in Plug-Cocks for Conduits of Elastic Fluids Under Pressure, of which the following is a specification.

The object of the present invention is the provision of a plug cock for conduits for conveying elastic fluids under pressure.

The invention relates more particularly to that type of stop-cock generally employed in the conduits of a Westinghouse continuous compressed air-brake for opening and closing said conduits at predetermined points. These cocks are carried by all locomotives and cars provided with air-brakes, and are usually examined and lubricated only at times of general overhauling, for instance every two years. As the compressed air dries up the lubricant a cock of this type as ordinarily constructed soon becomes difficult to operate and therefore wears rapidly, which causes leakage and requires rather long and tedious readjustment when being overhauled. Furthermore cocks which have become difficult to operate can be shut and opened only with much effort and then only with jerks, so they may become the cause of blocking an entire brake system.

These difficulties are overcome in the cock made according to the present invention owing to the fact lubrication is effected every time the cock is opened and closed by the aid of the elastic fluid under pressure within the conduit, in other words the cock made in accordance with my invention is self-lubricating. This cock comprises a casing fitted with a plug and having a chamber into which the fluid under pressure automatically passes from the conduit at each opening of the cock. The plug is so constructed as to provide means for the escape of the fluid under pressure from said chamber so as to carry along with it some of a lubricant contained within said chamber and to convey the same to the surfaces of contact between the casing and plug.

In the drawing Figures 1 and 3 are two side elevations taken at an angle of 90° from each other and Fig. 2 is an axial longitudinal section of a form of my improved plug cock.

The casing of this form of the invention is provided with two necks, a lower neck $a^1$ and an upper neck $a^2$. The cock $a^1$ is connected directly with an end $b$ of a pipe carried on the car with which the cock is to be employed, and the other neck $a^2$ connected indirectly by means of a pipe $c$ with a flexible hose, not represented, which couples this pipe to the pipe of the next car. This casing $a$ has the usual chamber $a^3$ shaped like the frustum of a cone and hermetically closed at its greater base by a threaded plug $d$. The chamber $a^3$ is fitted with a conical plug $e$ provided with the transverse passage way $e^1$ which establishes communication between the two necks $a^1$, $a^2$ and is trapezoidal in cross-section taken parallel to the longitudinal axis of said plug. This plug $e$ is kept tightly pressed against the walls of the casing by means of a helical spring $f$ acting against the greater base of the plug and the inner portion of the plug $d$. At its opposite extremity the plug terminates in a square end $e$ to which is secured a hand lever $g$. This lever is provided with a projecting nose $g^1$ lying within a recess in a flange $a^4$ on the casing $a$ so that those portions of the flange at the ends of the recess act as stops to limit the movement of the hand lever $g$ in turning the plug $e$ from its open to its closed position and vice versa.

To illustrate the use of this plug cock it will be supposed that a car has just been coupled to a train and that its pipe line has to be placed in communication with the pipe line of the train. To accomplish this the hand lever $g$ is turned in the direction indicated by the arrow in Fig. 2 in order to turn the plug from the position shown in the Figs. 1 and 2 to the position at 90° thereto, in which the passage-way $e^1$ puts the necks $a^1$ and $a^2$ into communication with each other. The compressed air in the conduit of the train is then admitted through the flexible pipe, not represented, and through the pipe $c$ and will pass through the passage-way $e^1$ into the reservoir and into the pipe line carried by the car. While passing through the passage-way $e^1$ the air will act against the walls thereof with uniform pressure per unit of area, and because the face $e^4$ is larger than the face $e^5$ will tend to move the plug $e$ in an axial direction from right to left against the action of the spring $f$. The spring $f$ is not stronger than the difference of the pressures against the faces $e^4$ and $e^5$ and therefore an axial movement of the plug takes place and this to such an extent that the conical surfaces of casing $a^3$ and plug $e$ will not be in close contact, and the compressed air traveling from right to left between said surfaces will enter the chamber $a^6$ between the plugs $e$ and $d$. This compressed air then acting against the greater base of plug $e$ united with the pressure against face $e^5$, together with the action of spring $f$ moves plug $e$ back again into contact with the surface of casing $a^3$.

In this manner there is an automatic lubrication of the plug $e$ each time the plug is opened because upon the compressed air being admitted to the chamber $a^6$ it forces a small quantity of the lubricant contained therein into the grooves $a^7$ and $a^8$. Any suitable lubricant may be employed and to increase its volume the walls of the chamber $a^6$ may be tapered or conical. In this lubrication the lubricant is forced by the compressed air through the grooves $a^7$ and $a^8$, provided in the conical walls of casing $a^3$ and extending from the chamber $a^6$ to points adjacent the opposite end of the casing $a^3$. In predetermined positions, the groove $a^8$ coincides with the groove $e^6$ and the groove $a^7$ with the groove $e^3$, and in the movement of the plug when these grooves coincide, a portion of the lubricant in the groove $a^8$ will be forced into the groove $e^6$ and a portion of the lubricant in the groove $a^7$ will be forced into the groove $a^3$. By this forcing the lubricant into the grooves $e^3$ and $e^6$, the entire bearing surfaces between the plug and the casing are maintained in a lubricated condition. Furthermore the groove $e^3$ in the surface of the plug $e$ makes a passage communicating between the interior of the neck $a^2$ and the atmosphere when the plug cock is closed, so that the medium under pressure which may then remain in the pipe connected to the neck $a^2$ makes escape to the atmosphere.

It will be apparent that the improvements comprising my present invention may be applied to any form of plug cock and its use is not necessarily limited to car cock plugs as herein described; but may be employed in any place where plug cocks are used.

I claim as my invention:—

1. A plug cock comprising a casing having a plug seat therein, there being a groove in the plug seat running from one end thereof to an appreciable distance from the other end thereof, and a plug fitting in the casing and having a port therein, there being a groove in the face of the plug running from the one end thereof, a sufficient distance to overlap the said groove in the plug seat.

2. A plug cock comprising a casing having a conical plug seat therein and a chamber for a lubricant at the larger end of the plug seat, there being grooves in the surface of the plug seat running from the larger end thereof to an appreciable distance from the smaller end thereof, and a conical plug fitting in the plug seat and having a port therein, there being grooves in the face of the plug extending from the smaller end thereof sufficiently far toward the larger end thereof to overlap the said grooves in the plug seat.

3. A plug cock comprising a casing having therein a conical plug seat and a chamber for a lubricant at the larger end of the plug seat, there being grooves in the plug seat extending from the larger end thereof to an appreciable distance from the smaller end thereof, a plug fitting within the plug seat and having a port therein, larger at one side than at the other, there being grooves in the face of the plug extending from the smaller end thereof to overlap the said grooves in the plug seat, means for normally maintaining the plug in contact with the plug seat, and means for turning the plug a partial revolution and limiting the extent of its movement in opening and closing the same.

In testimony whereof I affix my signature in presence of two witnesses.

ARMAND GIRARDET.

Witnesses:
   Rod de Wurtemberger,
   Louis H. Municer.